UNITED STATES PATENT OFFICE.

JAMES WINANTS TALLMADGE, OF BOSTON, MASSACHUSETTS.

CHEMICAL INK-ERASER.

SPECIFICATION forming part of Letters Patent No. 556,785, dated March 24, 1896.

Application filed December 26, 1895. Serial No. 573,280. (No specimens.)

*To all whom it may concern:*

Be it known that I, JAMES WINANTS TALLMADGE, a citizen of the United States, residing at Boston, in the county of Suffolk and Commonwealth of Massachusetts, have invented a new and useful Improvement in Chemical Fluid Ink-Erasers, which I have called "Improved Perennial Ink-Eraser," of which the following is a specification.

My invention is intended for the convenience of penmen (using or willing to use good standard inks and writing fluids) to erase blots and mistakes.

My invention consists of the following recipe, compounded in the proportions arbitrarily as set forth or with so slight deviation as to make no substantial difference.

Recipe: To one ounce of solution of chloride of lime add two drops of acetic acid impregnated with gum-camphor.

Solution of chloride of lime I make by placing one pound of chloride of lime in four quarts of water, thoroughly agitated and allowed to settle, then siphon the clear portion into another vessel, using only the clear portion.

Acetic acid impregnated with gum-camphor I prepare by placing one-half pound of finely-shaved gum-camphor in one quart of commercial acetic acid and siphon the clear portion into another vessel, using only the clear portion.

Directions for using: To remove fresh writing, first dry the ink with blotter, then dip penholder into eraser and apply plentifully without rubbing. After ink disappears absorb eraser with a clean white blotter. Sometimes (especially old dry) ink requires the application repeated.

This eraser does not destroy the ruling of mill-ruled paper or the printers' ink upon any printed form, leaving the paper hard and good to write upon as ever, slightly removing the gloss, thereby preventing its being used for any illegal purpose.

I am aware that chloride of lime and acetic acid have been used before, as patented to myself March 8, 1887; but I am not aware that all of the ingredients of my composition in the proportions and for the purpose stated have been used together.

Acetic acid impregnated with gum-camphor deodorizes the solution of chloride of lime and frees the eraser from smell of chlorine.

I claim—

The herein-described composition of matter to be used as an ink-eraser consisting of camphor, acetic acid and chloride of lime substantially as set forth.

JAMES WINANTS TALLMADGE.

Witnesses:
GEORGE M. WEED,
O. F. BACON.